June 16, 1936. A. A. CANTON Re. 20,004

DOOR CONSTRUCTION FOR REFRIGERATORS

Original Filed Nov. 2, 1932 2 Sheets-Sheet 1

INVENTOR

Allen A. Canton

June 16, 1936. A. A. CANTON Re. 20,004

DOOR CONSTRUCTION FOR REFRIGERATORS

Original Filed Nov. 2, 1932 2 Sheets-Sheet 2

INVENTOR

Allen A. Canton

Reissued June 16, 1936

Re. 20,004

UNITED STATES PATENT OFFICE 20,004

DOOR CONSTRUCTION FOR REFRIGERATORS

Allen A. Canton, New York, N. Y., assignor, by mesne assignments, to The Crosley Radio Corporation, Cincinnati, Ohio, a corporation of Ohio Original No. 2,021,096, dated November 12, 1935, Serial No. 640,871, November 2, 1932. Application for reissue April 24, 1936, Serial No. 76,295

18 Claims. (Cl. 62—89)

This invention relates to mechanical household refrigerators and more particularly to a novel door construction having a separate compartment therein for holding food.

In the ordinary household refrigerator as now constructed it is sometimes difficult to keep the foods which are used most, at the front where they can be readily accessible for the reason that as new foods are placed in the refrigerator the foods which have been formerly in front are more or less inadvertently moved back as the cabinet is filled with new foods. It is therefore the main object of the invention to divide the refrigerator into two compartments so as to separate the foods which are used more commonly from the other foods.

Some foods, as we known, desire a lower temperature than others to keep them fresh and healthful. It is therefore another object of the invention to provide a separate compartment having a lower temperature than the rest of the refrigerator where such foods can be stored.

Again some foods have certain distinctive odors or flavors which, when allowed to reach other foods, are apt to have deleterious effects on them. It is therefore a third object of the invention to provide two compartments with a wall separating said compartments so the scent, savor or flavor given off from the food in one compartment will not reach the other compartment.

In the present refrigerators, when the door is opened the warm air from the room completely fills the interior of the refrigerator thereby causing a loss in its efficiency and besides places an extra burden on the refrigerating machinery in order to chill the warm air which entered. In order to lessen this loss of efficiency it is a fourth object of the invention to provide two compartments for holding food so one compartment can be opened without allowing the warm air from the room to enter the other compartment which is closed.

Other objects of the invention will appear as the disclosure progresses. The drawings are intended to merely indicate a possible embodiment of the invention. It is obvious that the actual needs of manufacture may necessitate certain mechanical changes. It is therefore not intended to limit the invention to the embodiment illustrated but rather to define such limits in the appended claims.

For a more general understanding of the invention attention is called to the drawings in which.

Figure 1:
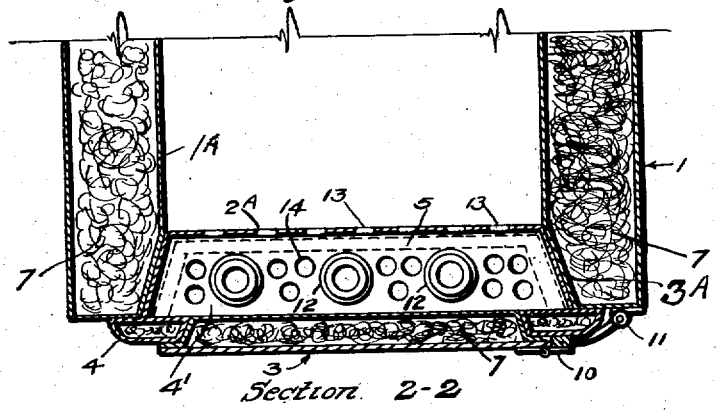
Figure 1 is a horizontal cross section of the front portion of the refrigerator.
Figure 2:
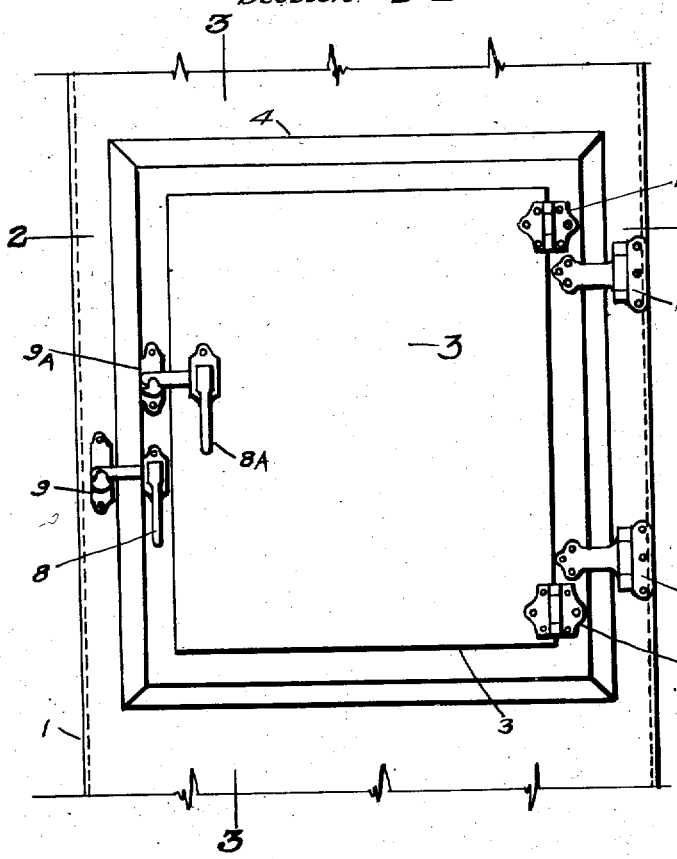
Figure 2 is a partial front view thereof.
Figure 3:
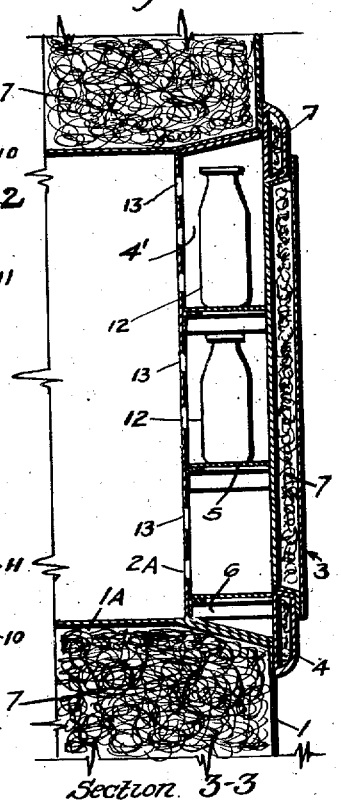
Figure 3 is a section on line 3—3 of Figure 2.

Referring now to the drawings in detail, numeral 1 designates the cabinet; 2 the outer shell of the refrigerator preferably made of sheet metal and 1A the inner shell of the cabinet. Between the inner and outer shells is the insulation 7. Numeral 3 represents an auxiliary door made of two walls of sheet metal with the insulating medium 7 between them. Said door fits in the front wall section of the main door 4 and is hinged to said main door by the hinges 10. The main door 4 closes the opening in the front wall of the cabinet and is defined by a breaker strip 3A (Figure 1) which, as is well known in all refrigerators having sheet metal inner and outer walls, comprises a frame of some insulating material such as hard wood or a synthetic resinoid composition or the equivalent to which said walls are united to avoid an all metal path for the conduction of heat into the refrigerator which would greatly decrease the efficiency thereof. The main door 4 is mounted on the hinges 11 which are fastened to the front wall of the refrigerator cabinet 1. Numeral 9 designates a standard lock and latch mechanism for latching the main door 4 to the cabinet 1 operable by the handle 8, and 9A represents a similar latch for latching the auxiliary door 3 to the main door 4 and operable by the handle 8A.

Between the inside wall 2A of the main door 4 and the auxiliary door 3 is a compartment 4' which enters the inside of the cabinet and is provided with shelves 5 supported on brackets 6 for holding bottles 12 or other foods. These shelves are preferably provided with holes or openings 14 so the air can freely circulate around the said shelves. The wall 2A of the main door may, if so desired, have a series of openings 13 to allow a free circulation of air between the main compartment and the auxiliary compartment formed in the main door 4.

Figure 4:
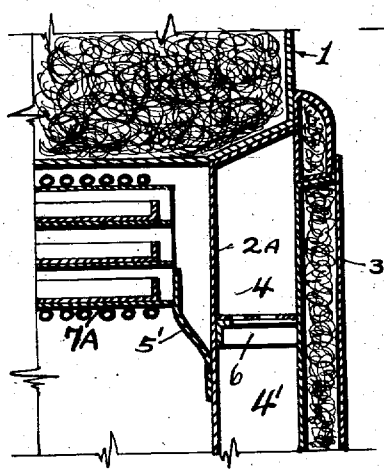
Figure 4 is a partial vertical section of the front of the refrigerator.

Numeral 7A represents the evaporator or cooling unit supported in the main compartment. Various means may be resorted to to cool the auxiliary compartment or, to put it in other words, to absorb the heat of the auxiliary compartment. The means shown in Figure 4 consists of contacting the evaporator 7A with a metallic resilient contact piece 5' which is permanently attached to the inner wall 2A of the main door 4. As this contact piece is attached to the said door 4 it will swing therewith. Now when the door is closed as shown in Figure 4 the contact piece will tightly press against the front of the evaporator and thereby act as a vehicle to transmit the cold temperature to the wall 2A and thence to the interior of the auxiliary cabinet.

Figure 5:
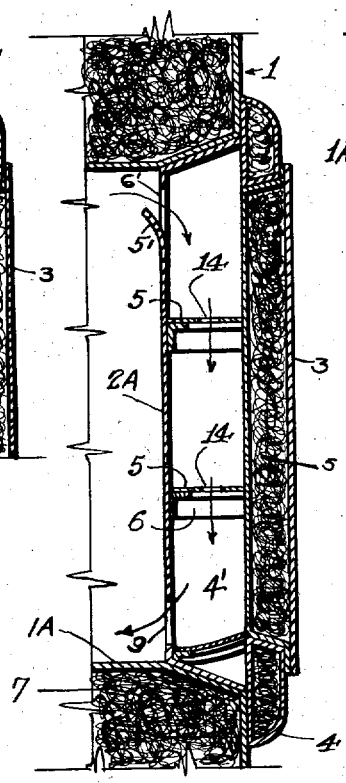
Figure 5 is a modified form of a partial vertical section of the front of the refrigerator and Figure 6 is another modified form of a partial vertical section of the front of the refrigerator.

In Figure 5 is shown another way to cool the auxiliary compartment which consists of causing a circulation of air in a vertical plane by providing slots in the top and bottom of the wall 2A for the air to circulate by. The slots 6' at the top are formed by bending a portion of the metallic wall inwardly towards the evaporator as at 5'. This bent portion will cause the stream of air to form a downwardly vertical path on entering the compartment. As the cold air is heavier than the warm air, the cold air will drop towards the bottom and on being warmed it will pass out to the main compartment by the way of the openings 8'.

Figure 6:
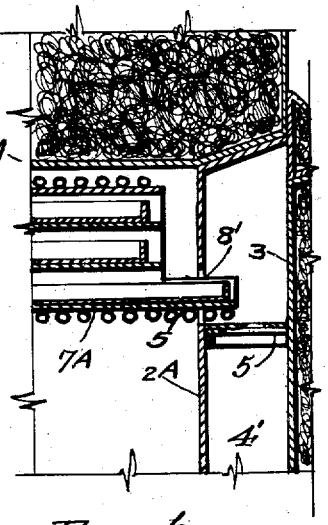

In Figure 6 is shown a third and direct method of cooling the auxiliary compartment. This method consists of providing an opening 8' in the wall 2A of the auxiliary compartment for allowing the forward end of the evaporator to enter therein. When the main door is closed as shown in this figure the front end of the evaporator will cool the compartment. As the front end of the evaporator is normally cooler than the rear end, the auxiliary compartment will actually be at a lower temperature than the main compartment. Also another very important advantage of this arrangement is that the trays of ice cubes from the evaporator can be removed by merely opening the auxiliary door 3 and without opening the main door, thereby conserving the low temperature in the main compartment.

It will thus been seen that I have provided an improved and efficient door construction for refrigerators which is of great usefulness and convenience. Without taking up any extra space and with no substantial increase in cost an extra compartment is added. Any slight increase in cost will be more than offset by the increase in efficiency when it is considered that the auxiliary door can be opened up and still keep the main compartment tightly shut. This extra or auxiliary compartment can be kept at a lower temperature than the rest of the refrigerator. Also it is praticularly handy to keep foods which are needed most often.

Having thus described my invention, what I claim as new and desire to secure by Letters Patent, is:

1. In a refrigerator of the class described comprising an insulated cabinet having an outer door and a cooling unit therein for setting up a circulation of air, the interior of said cabinet divided into two compartments, said cooling unit adapted to cool both of said compartments, a wall spaced from and extending substantially parallel to said outer door, separating both of said compartments and so constructed and arranged as to allow the air to circulate from one compartment into the other compartment, said wall being vertically hinged to swing out from said cabinet, and narrow shelves positioned between said wall and the outer door.

2. In a refrigerator of the class described comprising an insulated cabinet and a cooling unit therein for setting up a circulation of air, the interior of said cabinet divided into two compartments and having a wall between them, said cooling unit adapted to cool both of said chambers, said wall having an opening to allow a portion of said cooling unit to pass through.

3. In a refrigerator of the class described comprising an insulated cabinet and a cooling unit therein for setting up a circulation of air, the interior of said cabinet divided into two compartments and having a wall between them, said cooling unit adapted to cool both of said compartments, said wall having an opening at the top to allow the front of the cooling unit to enter and openings in the lower end of said wall to allow the air to circulate around said wall.

4. In a refrigerator of the class described comprising an insulated cabinet and a cooling unit therein, a hinged door for said cabinet, said door having an interior compartment for holding food and extending into said cabinet, an auxiliary door leading to said interior compartment, said cooling unit adapted to cool the inside of said cabinet and said interior compartment, the front of said cooling unit entering said interior compartment.

5. In a refrigerator of the class described comprising an insulated cabinet and a cooling unit therein, a hinged door for said cabinet, said door having an interior compartment for holding food and extending into said cabinet, an auxiliary door leading to said compartment, said cooling unit adapted to cool the interior of said cabinet and said interior compartment, said interior compartment having a rear wall provided with openings at the top and bottom to provide for a circulation of air.

6. In a refrigerator of the class described comprising an insulated cabinet and a cooling unit therein, a hinged door for said cabinet, said door having an interior compartment for holding food, said interior compartment extending into said cabinet, an auxiliary door leading to said interior compartment, said auxiliary door hinged to said hinged door, said cooling unit adapted to cool the interior of said cabinet and the said interior compartment, said interior compartment having a rear wall provided with openings at the top and bottom to provide for a circulation of air in a vertical plane.

7. In a refrigerator of the class described, an insulated cabinet, a hinged member adapted to open and close said cabinet, the interior of said hinged member being hollowed out to hold food, the rear of the hollowed out portion of the said hinged member adapted to protrude in the interior of said cabinet, a cooling unit in the interior of said cabinet, the rear wall of said hinged member provided with openings for allowing the cold air from the cooling unit to circulate in said hollowed out portion, and an auxiliary door leading to said hollowed out member.

8. A mechanical refrigerator having the usual insulated cabinet and evaporator, a door for said cabinet, said door being hollowed out and having a rear wall, said hollowed out portion of the door adapted to hold food, and means to make direct contact with the said evaporator and said rear wall so the said evaporator will absorb the heat of said rear wall and the food contained in said hollowed out portion of the door.

9. A domestic refrigerator comprising a cabinet provided with cold-producing means situated therein which causes a circulation of air, a movable door, an auxiliary food compartment associated therewith, means for securing the auxiliary food compartment in fixed relationship with respect to the cabinet whereby the door may be opened to expose the auxiliary food compartment without disturbing its secured position.

10. In a domestic refrigerator, in combination, a cabinet, an evaporator therein for producing cold and causing a circulation of air, said cabinet having an opening in the front thereof closed by a movable door and the door being provided with an auxiliary food compartment in heat exchange relationship with the cooled air produced in said cabinet and means for exposing said food compartment from the outside without disturbing the secured position of the door relative to the cabinet.

11. In a domestic refrigerator, in combination, a cabinet having rear and side walls and a front opening, a door for closing said front opening, said door being shaped to define an auxiliary food compartment in heat exchange relationship with respect to said cabinet whereby to cool the articles therein, a panel for closing said auxiliary food compartment from the outside, said panel being movable without disturbing the closed position of said door whereby to expose the articles in the auxiliary food compartment and movable simultaneously with said door, in fixed relation therewith when access to the cabinet is desired.

12. A domestic refrigerator comprising a cabinet provided with cold-producing means situated therein which causes a circulation of air therein, a movable door comprising an inner wall and an outer wall defining therebetween an auxiliary food compartment, said outer wall being provided with securing means permitting it to be opened to expose said food compartment without disturbing the secured position of the inner wall relative to the cabinet, and means whereby both of said walls and the food compartment provided therebetween may be conjointly opened in their fixed relationship when access to the interior of the cabinet is desired.

13. A domestic refrigerator comprising a cabinet provided with cold-producing means situated therein which causes a circulation of air therein, a movable door comprising an inner and an outer wall providing an auxiliary food compartment adapted to be cooled by the cold-producing means situated within the cabinet, and the outer wall being movable independently of the inner wall and while the inner wall remains in closed position with respect to the cabinet, whereby the auxiliary food compartment is accessible from the outside of the cabinet without opening the cabinet to the atmosphere, and means for securing the outer wall in fixed relation with respect to the inner wall.

14. A domestic refrigerator comprising a cabinet provided with cold-producing means situated therein which causes a circulation of air therein, a movable door having formed therein an auxiliary food compartment so constructed and arranged as to be affected by the circulation of air within the cabinet, means for permitting access to the food compartment from the outside of the cabinet, said means comprising a movable panel constructed to be opened without disturbing the closed position of the door relative to the cabinet whereby to prevent exposure of the cabinet when the auxiliary food compartment is being utilized, and means for securing the panel in fixed relation relative to the door when the door is in closed or open position.

15. A domestic refrigerator comprising a cabinet provided with cold-producing means situated therein which causes a circulation of air therein, a movable door, an auxiliary food compartment associated therewith, securing means for holding the auxiliary food compartment in fixed relationship with respect to the cabinet whereby the door may be opened to expose the auxiliary food compartment without disturbing its secured position and means whereby both the door and food compartment associated therewith may be conjointly opened when access to the interior of the cabinet is desired.

16. A domestic refrigerator comprising a cabinet provided with cold-producing means situated therein which causes a circulation of air therein, a movable door and an auxiliary food compartment associated therewith and so constructed and arranged as to be affected by the circulation of air within the cabinet, means for fixing the position of the auxiliary food compartment relative to the cabinet whereby the door may be moved to permit access to the auxiliary food compartment from the outside of the cabinet without disturbing the fixed position of the auxiliary food compartment relative to the cabinet, and means for fixing the position of the food compartment relative to the door whereby they may be moved together when access to the cabinet is desired.

17. In the art of domestic refrigeration, a cabinet comprising a side and end walls and an opening at the front thereof, a door for closing said opening, said door being shaped to provide a food compartment subject to the currents of cold air produced in said cabinet and means for exposing said food compartment provided by the door from the outside of the cabinet without necessarily disturbing the fixed relation of the door relative to the cabinet.

18. A domestic refrigerator comprising a cabinet provided with cold-producing means situated therein which causes a circulation of air therein, a movable door comprising an inner and an outer wall providing an auxiliary food compartment, said outer wall being adapted to be opened to expose said food compartment without disturbing the closed position of the inner wall relative to the cabinet whereby to prevent the cabinet being opened to the atmosphere when the auxiliary food compartment is utilized.

ALLEN A. CANTON.